United States Patent
Yoon

(10) Patent No.: US 9,904,737 B2
(45) Date of Patent: Feb. 27, 2018

(54) METHOD FOR PROVIDING CONTENTS CURATION SERVICE AND AN ELECTRONIC DEVICE THEREOF

(71) Applicant: Samsung Electronics Co., Ltd., Gyeonggi-do (KR)

(72) Inventor: Je-Sang Yoon, Chungcheongnam-do (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 260 days.

(21) Appl. No.: 14/120,328

(22) Filed: May 14, 2014

(65) Prior Publication Data
US 2014/0344739 A1 Nov. 20, 2014

(30) Foreign Application Priority Data
May 14, 2013 (KR) ........................ 10-2013-0054187

(51) Int. Cl.
G06F 3/048 (2013.01)
G06F 17/30 (2006.01)
H04L 29/08 (2006.01)
G06F 3/0486 (2013.01)
G06F 3/0481 (2013.01)

(52) U.S. Cl.
CPC .. *G06F 17/30884* (2013.01); *G06F 17/30165* (2013.01); *G06F 3/0481* (2013.01); *G06F 3/0486* (2013.01); *H04L 29/08072* (2013.01)

(58) Field of Classification Search
USPC .............................................. 715/769, 748
See application file for complete search history.

(56) References Cited

U.S. PATENT DOCUMENTS

| | | | |
|---|---|---|---|
| 6,324,544 B1 | 11/2001 | Alam et al. | |
| 2004/0103174 A1 | 5/2004 | Balducci et al. | |
| 2009/0322775 A1* | 12/2009 | Fukuda | G06T 11/60 345/581 |
| 2011/0310034 A1* | 12/2011 | Ouchi | G06F 1/1616 345/173 |
| 2012/0174007 A1 | 7/2012 | Lee et al. | |
| 2013/0018939 A1* | 1/2013 | Chawla | H04L 67/08 709/203 |

(Continued)

OTHER PUBLICATIONS

Barbie E. Keiser, Social Bookmarks for the 21st Century, Jul./Aug. 2012. Information Today Inc., vol. 36, Pagination 19-23.*

(Continued)

*Primary Examiner* — Tam Tran

(57) ABSTRACT

A method for providing a contents curation service in an electronic device includes selecting a part or entirety of the contents, detecting that the selected part or entirety of the contents moves to an area of a screen, and storing the selected part or entirety of the contents to a folder, if the selected part or entirety of the contents moves to the area of the screen. An electronic includes a processor configured to select a part or entirety of the content, a touch screen configured to detect that the selected part or entirety of the contents moves to an area of a screen, and a memory configured to store the selected part or entirety of the content to a folder, if it is detected that the selected part or entirety of the content moves to the area of the screen.

18 Claims, 5 Drawing Sheets

(56) References Cited

U.S. PATENT DOCUMENTS

| | | | | |
|---|---|---|---|---|
| 2013/0212112 A1* | 8/2013 | Blom | ................ | G06F 17/30115 |
| | | | | 707/741 |
| 2013/0254719 A1* | 9/2013 | Hanazaki | .............. | G06F 3/0486 |
| | | | | 715/846 |
| 2013/0290855 A1* | 10/2013 | Ashcraft | ............... | G06F 3/0486 |
| | | | | 715/738 |
| 2013/0332841 A1* | 12/2013 | Gallet | ................... | G06F 3/0481 |
| | | | | 715/738 |
| 2014/0087654 A1* | 3/2014 | Kiveisha | ............. | H04B 5/0031 |
| | | | | 455/41.1 |

OTHER PUBLICATIONS

Jenny Lum, Coliris brings endless photo discovery experience to iPad and iPhone, Apr. 4, 2013, PR Newswire Asia, pp. 1-3.*

* cited by examiner

METHOD FOR PROVIDING CONTENTS CURATION SERVICE AND AN ELECTRONIC DEVICE THEREOF

PRIORITY

The present application is related to and claims the benefit under 35 U.S.C. § 119(a) of a Korean patent application No. 10-2013-0054187 filed in the Korean Intellectual Property Office on May 14, 2013, the entire disclosure of which is hereby incorporated by reference.

TECHNICAL FIELD

The present invention relates to a method for providing a contents curation service and an electronic device thereof.

BACKGROUND

With the introduction of various Social Networking Services (SNSs) such as FaceBook, Twitter, YouTube, blog, etc., users can share their interests with others by establishing a relationship and communicating with them. In addition, the SNS enables smooth communication between individuals, and the users can acquire a variety of information on a real-time basis.

However, as the SNS is developed more and more, abundant information is provided to an individual. In case of Facebook™ and Twitter™, which are representative SMS media, about hundreds of million pieces of information and texts are posted a day. When a user enters a search keyword in a "Naver" search window, tens of thousands of blogs, images, news, cafe postings, etc., are found. Such a great amount of information makes the user have a difficulty in finding desired data. Accordingly, it becomes important to obtain and share valuable information, and thus a curation starts to get attention. A "contents curation service" is a service for providing contents related to or presumably liked by the user by collecting, arranging, and editing related contents according to a personal perspective or viewpoint among a large amount of contents on the on-line.

Meanwhile, cloud computing has recently been generalized in which software programs and contents are stored not in a personal computer or a smart phone but in an external large-scale computer server so as to be used whenever required through an Internet access. The cloud computing is an "on-demand outsourcing service of an Information Technology (IT) resource through the Internet, and is a method of performing a task desired by a user in such a manner that a program or document stored individually in a personal computer or a business server is stored in an Internet-based virtual server or storage, and a cloud application such as a web browser, etc., is driven by using various terminals in addition to the personal computer.

Accordingly, it is proposed a contents curation service using clouding computing.

SUMMARY

To address the above-discussed deficiencies, it is a primary object to provide a method and apparatus for providing a contents curation service in an electronic device.

Another aspect of the present invention is to provide a method and apparatus for sharing contents with different electronic devices of a plurality of sharing users by scrapping a part or entirety of contents in an electronic device.

Another aspect of the present invention is to provide a method and apparatus for scrapping a part or entirety of specific contents by considering a user convenience in an electronic device.

Another aspect of the present invention is to provide a method and apparatus capable of rapidly opening contents scrapped by a specific user in a wallpaper in an electronic device.

In accordance with a first aspect of the present invention, a method for providing a contents curation service of an electronic device is provided. The method includes selecting a part or entirety of the contents, detecting that the selected part or entirety of the contents moves to a specific area of a screen, and storing the selected part or entirety of the contents to a specific folder, if it is detected that the selected part or entirety of the contents moves to the specific area of the screen.

In addition, the specific area may be generated and displayed in a sliding manner, when the part or entirety of the contents is selected or the part or entirety of the contents moves after selection.

In addition, the method further includes performing a preview of the contents in the specific folder in a thumbnail or tile form when the specific folder is open.

In addition, the method further includes downloading a file corresponding to the selected contents from a server when one of the contents in the specific folder is selected, and displaying the downloaded file via a corresponding viewer.

In addition, the method further includes loading a file corresponding to the selected contents from an internal auxiliary memory to a main memory when one of the contents in the specific contents is selected, and displaying the loaded file via a corresponding viewer.

In addition, when the part or entirety of the selected contents is stored in the specific folder, the part or entirety of the selected contents may be stored in a corresponding file format according to an attribute of the selected contents.

In addition, the method further includes uploading the part or entirety of the selected contents.

In accordance with a second aspect of the present invention, a method for providing a contents curation service of an electronic device is provided. The method includes setting a sharing of a specific folder by designating at least one sharing user, transmitting a share grant message for the specific folder to the at least one sharing user, and receiving an accept message for the share grant message from the at least one sharing user, synchronizing the specific folder with a folder of the second electronic device, wherein the specific folder is located in a home screen or a wallpaper, and is a storage space for storing contents scrapped by a user.

In addition, the method further includes uploading the contents in the specific folder to a server.

In addition, the at least one sharing user may be designated by one of an e-mail, phone number, i-pin, and identifier of the sharing user.

In addition, the setting of the sharing of the specific folder includes sharing all contents in the specific folder with the at least one sharing user.

In addition, the setting of the sharing of the specific folder includes sharing each of the contents in the specific folder with some of the at least one sharing user or to all sharing users.

In accordance with a third aspect of the present invention, a method for providing a contents curation service of a first electronic device is provided. The method includes receiving from a second electronic device a share grant message for a specific folder of the second electronic device, transmitting to the second electronic device an accept response message for the share grant message, synchronizing the specific folder with a folder of the second electronic device, wherein the specific folder is located in a home screen or a wallpaper, and is a storage space for storing contents scrapped by a user In addition, the method further includes selecting a part or entirety of the contents, detecting that the selected part or entirety of the contents moves to a specific area of a screen, and copying a file corresponding to the selected part or entirety of the contents to a specific folder of the second electronic device, if it is detected that the selected part or entirety of the contents moves to the specific area of the screen.

In addition, the copying of the file corresponding to the selected part or entirety of the contents to a specific folder of the second electronic device includes uploading the file corresponding to the selected part or entirety of the contents to a server.

In addition, the method further includes performing a preview of the contents in the specific folder in a thumbnail or tile form when the specific folder of the second electronic device is open.

In addition, the method further includes downloading a file corresponding to the selected contents from a server when one of the contents in the specific folder of the second electronic device is selected, and displaying the downloaded file via a corresponding viewer.

In accordance with a fourth aspect of the present invention, an apparatus for providing a contents curation service of an electronic device is provided. The apparatus includes a processor for selecting a part or entirety of the contents, a touch screen for detecting that the selected part or entirety of the contents moves to a specific area of a screen, and a memory for storing the selected part or entirety of the contents to a specific folder, if it is detected that the selected part or entirety of the contents moves to the specific area of the screen.

In addition, the specific area may be generated and displayed in a sliding manner, when the part or entirety of the contents is selected or the part or entirety of the contents moves after selection.

In addition, the processor may perform a preview of the contents in the specific folder in a thumbnail or tile form when the specific folder is open.

In addition, the processor may download a file corresponding to the selected contents from a server when one of the contents in the specific folder is selected, and may display the downloaded file via a corresponding viewer.

In addition, the processor may load a file corresponding to the selected contents from an internal auxiliary memory to a main memory when one of the contents in the specific contents is selected, and may display the loaded file via a corresponding viewer.

In addition, when the part or entirety of the selected contents is stored in the specific folder, the part or entirety of the selected contents may be stored in a corresponding file format according to an attribute of the selected contents.

In addition, the processor may upload the part or entirety of the selected contents.

In accordance with a fifth aspect of the present invention, an apparatus for providing a contents curation service of an electronic device is provided. The apparatus includes a processor for setting a sharing of a specific folder by designating at least one sharing user, for transmitting a share grant message for the specific folder to the at least one sharing user, and for receiving an accept message for the share grant message from the at least one sharing user, synchronizing the specific folder with a folder of the second electronic device wherein the specific folder is located in a home screen or a wallpaper, and is a storage space for storing contents scrapped by a user, and wherein the specific folder is displayed on a screen of the at least one sharing user in synchronization with the at least one sharing user when the accept message is received.

In addition, the processor may upload the contents in the specific folder to a server.

In addition, the at least one sharing user may be designated by one of an e-mail, phone number, i-pin, and identifier of the sharing user.

In addition, when the sharing of the specific folder is set, all contents in the specific folder may be shared to the at least one sharing user.

In addition, when the sharing of the specific folder is set, each of the contents in the specific folder may be shared to some of the at least one sharing user or to all sharing users.

In accordance with a sixth aspect of the present invention, an apparatus for providing a contents curation service of a first electronic device is provided. The apparatus includes a processor for receiving from a second electronic device a share grant message for a specific folder of the second electronic device, for transmitting to the second electronic device an accept response message for the share grant message, and synchronizing the specific folder with a folder of the second electronic device when the accept response message is transmitted, wherein the specific folder is located in a home screen or a wallpaper, and is a storage space for storing contents scrapped by a user In addition, the processor may select a part or entirety of the contents, detect that the selected part or entirety of the contents moves to a specific area of a screen, and copy a file corresponding to the selected part or entirety of the contents to a specific folder of the second electronic device, if it is detected that the selected part or entirety of the contents moves to the specific area of the screen.

In addition, the processor may copy a file corresponding to the selected part or entirety of the contents to a specific folder of the second electronic device, and upload the file corresponding to the selected part or entirety of the contents to a server.

In addition, the processor may perform a preview of the contents in the specific folder in a thumbnail or tile form when the specific folder of the second electronic device is open.

In addition, the processor may download a file corresponding to the selected contents from a server when one of the contents in the specific folder of the second electronic device is selected, and display the downloaded file via a corresponding viewer.

In accordance with a seventh aspect of the present invention, an electronic device is provided. The electronic device includes one or more processors, a memory, and a program stored in the memory and executed by the one or more processors. The program includes an instruction for selecting a part or entirety of the contents, detecting that the selected part or entirety of the contents moves to a specific area of a screen, and storing the selected part or entirety of the contents to a specific folder, if it is detected that the selected part or entirety of the contents moves to the specific area of the screen.

In addition, the specific folder may be located in a wallpaper or a home screen. In addition, the program further includes an instruction for performing a preview of the contents in the specific folder in a thumbnail or tile form when the specific folder is open.

In addition, the program further includes an instruction for downloading a file corresponding to the selected contents from a server when one of the contents in the specific folder is selected, and displaying the downloaded file via a corresponding viewer.

In addition, the program further includes an instruction for loading a file corresponding to the selected contents from an internal auxiliary memory to a main memory when one of the contents in the specific contents is selected, and displaying the loaded file via a corresponding viewer.

In addition, when the part or entirety of the selected contents is stored in the specific folder, the part or entirety of the selected contents may be stored in a corresponding file format according to an attribute of the selected contents.

In accordance with an eighth aspect of the present invention, an electronic device is provided. The electronic device includes one or more processors, a memory, and a program stored in the memory and executed by the one or more processors. The program includes an instruction for setting a sharing of a specific folder by designating at least one sharing user, transmitting a share grant message for the specific folder to the at least one sharing user, and receiving an accept response message for the share grant message from the at least one sharing user, for synchronizing the specific folder with a folder of the second electronic device wherein the specific folder is located in a home screen or a wallpaper, and is a storage space for storing contents scrapped by a user.

In addition, the program further includes an instruction for uploading the contents in the specific folder to a server.

In addition, the at least one sharing user may be designated by one of an e-mail, phone number, i-pin, and identifier of the sharing user.

In addition, the instruction for setting the sharing of the specific folder includes sharing all contents in the specific folder with the at least one sharing user.

In addition, the instruction for setting the sharing of the specific folder includes sharing each of the contents in the specific folder with some of the at least one sharing user or to all sharing users.

In accordance with a ninth aspect of the present invention, a first electronic device is provided. The first electronic device includes one or more processors, a memory, and a program stored in the memory and executed by the one or more processors. The program includes an instruction for receiving from a second electronic device a share grant message for a specific folder of the second electronic device, transmitting to the second electronic device an accept response message for the share grant message, and synchronizing the specific folder with a folder of the second electronic device, wherein the specific folder is located in a home screen or a wallpaper, and is a storage space for storing contents scrapped by a user.

In addition, the program further includes an instruction for selecting a part or entirety of the contents, detecting that the selected part or entirety of the contents moves to a specific area of a screen, and copying a file corresponding to the selected part or entirety of the contents to a specific folder of the second electronic device, if it is detected that the selected part or entirety of the contents moves to the specific area of the screen.

In addition, the instruction for copying the file corresponding to the selected part or entirety of the contents to a specific folder of the second electronic device includes uploading the file corresponding to the selected part or entirety of the contents to a server.

In addition, the program further includes an instruction for performing a preview of the contents in the specific folder in a thumbnail or tile form when the specific folder of the second electronic device is open.

In addition, the program further includes an instruction for downloading a file corresponding to the selected contents from a server when one of the contents in the specific folder of the second electronic device is selected, and displaying the downloaded file via a corresponding viewer.

In accordance with a tenth aspect of the present invention, an electronic device is provided. The electronic device includes one or more processors, a memory, and a program stored in the memory and executed by the one or more processors. The program includes an instruction for an instruction for selecting a part or entirety of the contents, detecting that the selected part or entirety of the contents moves to a specific area of a screen, and copying a file corresponding to the selected part or entirety of the contents to a specific folder of the electronic device, if it is detected that the selected part or entirety of the contents moves to the specific area of the screen.

In addition, the specific area may be generated and displayed in a sliding manner, when the part or entirety of the contents is selected or the part or entirety of the contents moves after selection.

In addition, the program further includes an instruction for performing a preview of the contents in the specific folder in a thumbnail or tile form when the specific folder is open.

In addition, the program further includes an instruction for downloading a file corresponding to the selected contents from a server when one of the contents in the specific folder is selected, and displaying the downloaded file via a corresponding viewer.

In addition, the program further includes an instruction for loading a file corresponding to the selected contents from an internal auxiliary memory to a main memory when one of the contents in the specific contents is selected, and displaying the loaded file via a corresponding viewer.

In addition, when the part or entirety of the selected contents is stored in the specific folder, the part or entirety of the selected contents may be stored in a corresponding file format according to an attribute of the selected contents.

In addition, the program further includes an instruction for uploading the part or entirety of the selected contents.

In accordance with an eleventh aspect of the present invention, an electronic device is provided. The electronic device includes one or more processors, a memory, and a program stored in the memory and executed by the one or more processors. The program includes an instruction for an instruction for setting a sharing of a specific folder by designating at least one sharing user, for transmitting a share grant message for the specific folder to the at least one sharing user, and for receiving an accept response message for the share grant message from the at least one sharing user, for synchronizing the specific folder with a folder of the second electronic device, and wherein the specific folder is displayed on a screen of the at least one sharing user in synchronization with the at least one sharing user when the accept response message is received.

In addition, the program further includes an instruction for uploading the contents in the specific folder to a server.

In addition, the at least one sharing user may be designated by one of an e-mail, phone number, i-pin, and identifier of the sharing user.

In addition, the instruction for setting the sharing of the specific folder includes sharing all contents in the specific folder with the at least one sharing user.

In addition, the instruction for setting the sharing of the specific folder includes sharing each of the contents in the specific folder with some of the at least one sharing user or to all sharing users.

In accordance with a twelfth aspect of the present invention, an apparatus for providing a contents curation service of a first electronic device is provided. The apparatus includes a processor for receiving from a second electronic device a share grant message for a specific folder of the second electronic device, for transmitting to the second electronic device an accept response message for the share grant message, and for displaying the specific folder of the second electronic device on a screen in synchronization with the second electronic device when the accept response message is transmitted, wherein the specific folder is located in a home screen or a wallpaper, and is a storage space for storing contents scrapped by a user.

In addition, the processor selects a part or entirety of the contents, detect that the selected part or entirety of the contents moves to a specific area of a screen, and copy a file corresponding to the selected part or entirety of the contents to a specific folder of the second electronic device, if it is detected that the selected part or entirety of the contents moves to the specific area of the screen.

In addition, the processor copies a file corresponding to the selected part or entirety of the contents to a specific folder of the second electronic device, and upload the file corresponding to the selected part or entirety of the contents to a server.

In addition, the processor performs a preview of the contents in the specific folder in a thumbnail or tile form when the specific folder of the second electronic device is open.

In addition, the processor may download a file corresponding to the selected contents from a server when one of the contents in the specific folder of the second electronic device is selected, and display the downloaded file via a corresponding viewer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
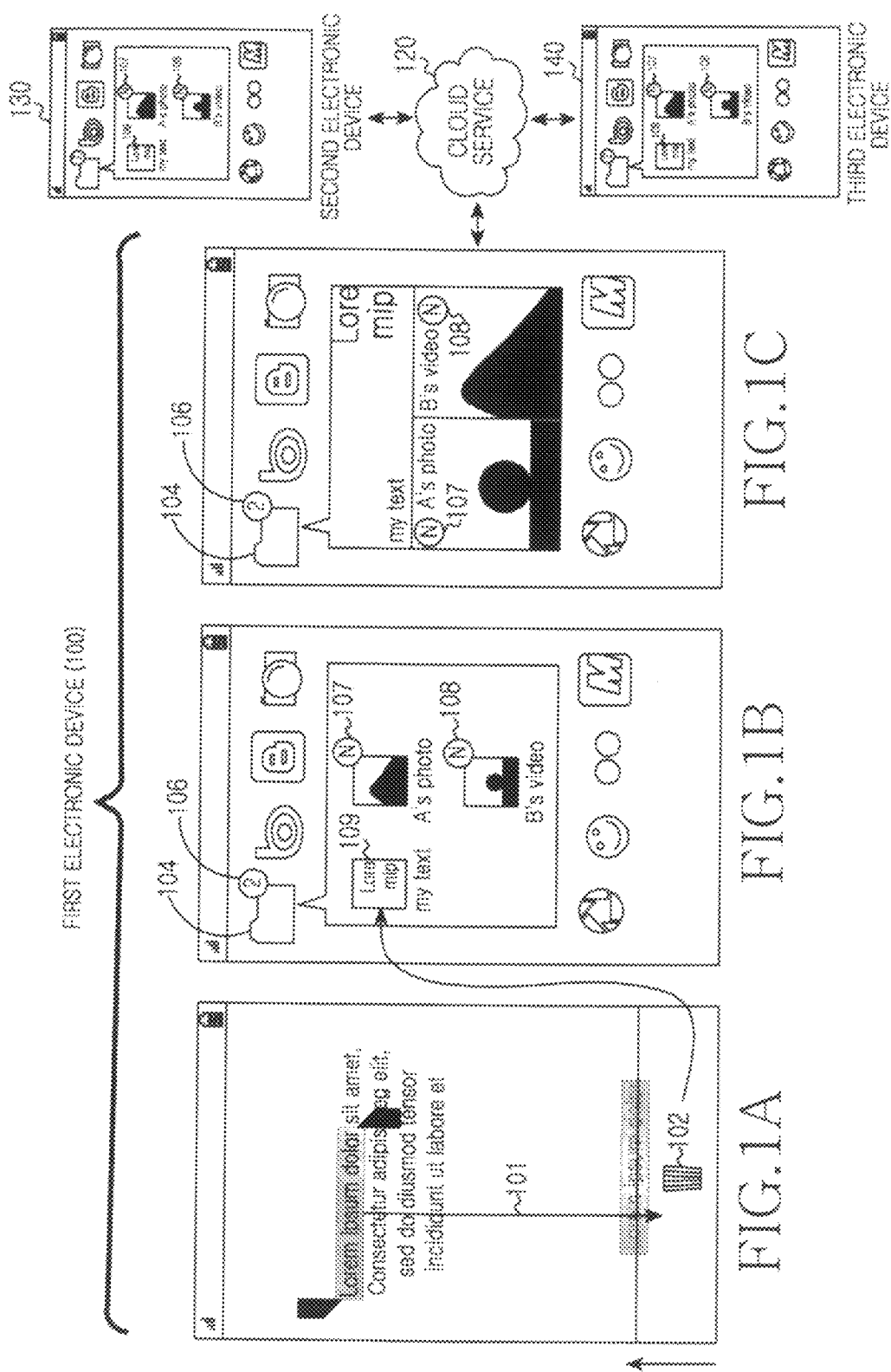
FIGS. 1A, 1B and 1C represent elements of a system for providing a contents curation service according to an embodiment of the present invention.

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, a method and apparatus for providing a contents curation service in an electronic device will be described according to exemplary embodiments of the present invention. The present invention relates to a method and apparatus in which an electronic device scraps a part or entirety of contents to be shared to each of different electronic devices of a plurality of sharing users.

FIGS. 1A, 1B and 1C illustrate a system for providing a contents curation service according to an exemplary embodiment of the present invention.

Referring to FIGS. 1A to 1C, the system can include a first electronic device 100 for generating/managing a folder (hereinafter, a "curation folder") for the contents curation service, second and third electronic devices 130 and 140 for displaying the curation folder of the first electronic device 100 in their screens by sharing the curation folder, and a cloud service provider 120 for providing the curation folder of the first electronic device 10 to the second and third electronic devices 130 and 140. The electronic devices for sharing the curation folder of the first electronic device 100 are not limited to the second and third electronic devices 130 and 140, and thus more electronic devices can share the curation folder of the first electronic device 100 according to a configuration of the first selection device 100.

The curation folder is a storage space for storing contents (e.g., video, music, a file corresponding to a webpage scrap) interested by a user, and the curation folder can be shared to different users. In addition, the curation folder can be located in a wallpaper or a home screen. In addition, the curation folder can be generated in plural number in one electronic device according to a user's interest, or can exist by sharing a plurality of curation folders of different users.

In the operation for generating the contents in the curation folder and for sharing the curation folder, the content of a webpage interested by a first user can be partially scrapped first in a first electronic device. For example, as shown in FIG. 1A, when a part of text is designated as a block in the webpage content, a basket area 102 in a lower portion of a screen is displayed in a sliding manner. That is, the basket area 102 is raised from down to up. In this case, when the part of text in the webpage content designated as the block is dragged to the basket area 102, as shown in FIG. 1B, it can be generated and displayed in a corresponding file format in a curation folder 103. For example, when the text is designated as the block and is then dragged, the text designated as the block can be generated in a file of a text format.

Herein, the basket area 102 is not limited to the lower portion of the screen, and can be displayed in various positions of the screen. For example, it can be displayed to an upper portion, right portion, or left portion of the screen.

In addition, an object which is designated as a block in contents such as a webpage or a document is not limited to a text, and thus various types of object such as an image, etc., can be designated as the block. In this case, according to the type of object designated as the block, an object to be scrapped can be stored in a curation folder in a corresponding file format. For example, if the object designated by the block is an image, the object designated by the block can be stored in the curation folder as a file of the image format.

According to another embodiment, when a photo, video file, music file, or text located in a specific folder is dragged to the basket area 102, the phone, video file, music file, or text can be moved or copied from the specific folder to the curation folder.

Meanwhile, when the curation folder 104 of the home screen or the wallpaper is open, as shown in FIG. 1B, scrapped contents in the curation folder can be displayed in a thumbnail form. In another exemplary embodiment, when the curation folder 104 of the home screen or the wallpaper is open, as shown in FIG. 1C, scrapped contents in the curation folder can be displayed in a tile form.

Thereafter, the scrapped contents in the curation folder can be shared according to a user setting. That is, the curation folder itself can be shared to sharing users designated by the user, or can be shared to sharing users designated by the user for each of contents in the curation folder.

For example, when the curation folder itself is shared to the sharing users designated by the user, all contents in the curation folder of the first electronic device can be shared to the second electronic device 130 and the third electronic device 140 via the cloud service provider 120.

Alternatively, when the curation folder is shared for each of contents in the curation folder 104, via the cloud service provider 120, first contents in the curation folder 104 of the first electronic device 100 can be shared only to the second electronic device 130 and second contents in the curation folder of the first electronic device 100 can be shared only to the third electronic device 140. According to another exemplary embodiment, the first contents and second contents in the curation folder 104 of the first electronic device 100 can be shared to the second electronic device 130, and the first contents in the curation folder 104 of the first electronic device 100 can be shared to the third electronic device 140.

In addition, the scrapped contents in the curation folder are uploaded to the cloud service provider 120 when shared according to the user setting, and a share grant message is transmitted to the second electronic device 130 and the third electronic device 140. In this case, the second electronic device 130 and the third electronic device 140 can transmit a response message for the share grant request for the curation folder 104 of the first electronic device 100. If the second electronic device 130 and the third electronic device 140 accept the share request for the curation folder 104 of the first electronic device 100, the curation folder 104 of the first electronic device 100 can be generated and displayed in each of screens of the second electronic device 130 and the third electronic device 140.

As such, when the curation folder 104 of the first electronic device 100 is shared to the second electronic device 130 and the third electronic device 140, the second electronic device 130 or the third electronic device 140 can add contents to the curation folder 104 of the first electronic device 100. For example, the second electronic device 130 can add its scrapped contents 108 to the curation folder 104 of the first electronic device 100, or can add its scrapped contents 107 to the curation folder 104 of the first electronic device 100.

In this case, a badge can be displayed to indicate that scrap contents added by an electronic device of another user are newly added. For example, from a perspective of the first electronic device 100, when the scrap contents 107 and 108 are added to its curation folder 104 by the second electronic device 130 and the third electronic device 140, a number "2" can be displayed on an icon of the curation folder 104, and when the curation folder 104 is open, a badge "N" can be displayed on each of icons corresponding to the scrap contents 107 and 108. In addition, from a perspective of the second electronic device 130, when the scrap contents 107 and 109 are added to the curation folder 104 of the second electronic device 130 by the first electronic device 100 and the third electronic device 140, a number "2" can be displayed on an icon of the curation folder 104, and when the curation folder 104 is open in the second electronic device 130, a badge "N" can be displayed on each of icons corresponding to the scrap contents 107 and 109. Likewise, from a perspective of the third electronic device 140, when the scrap contents 107 and 109 are added to the curation folder 104 of the third electronic device 140 by the first electronic device 100 and the second electronic device 130, a number "2" can be displayed on an icon of the curation folder 104, and when the curation folder 104 is open in the third electronic device 140, a badge "N" can be displayed on each of icons corresponding to the scrap contents 107 and 109.

Figure 2:
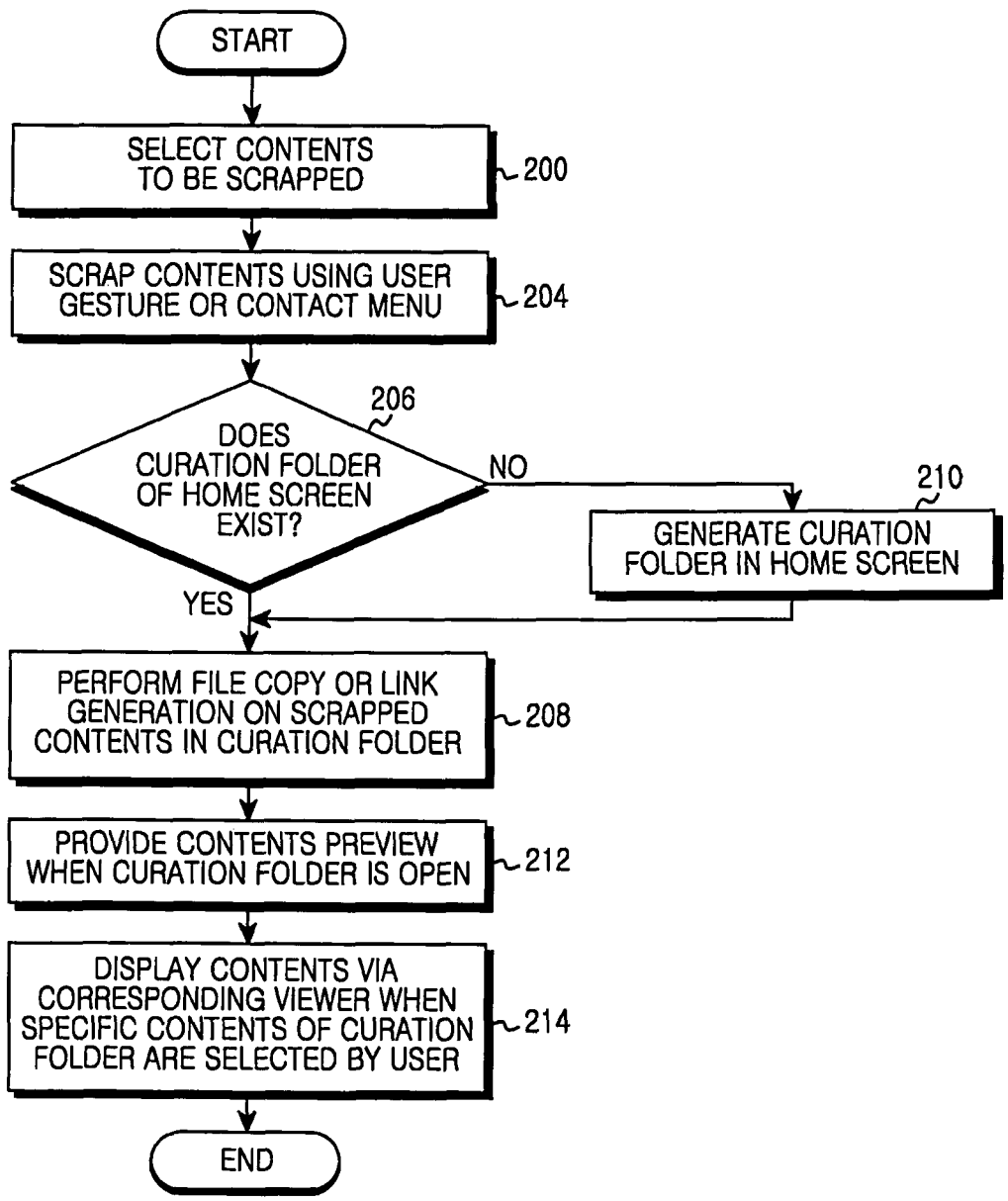
FIG. 2 is a flowchart illustrating an operation of a first electronic device for managing a curation folder for a contents curation service according to an embodiment of the present invention.

FIG. 2 is a flowchart illustrating an operation of a first electronic device for managing a curation folder for a contents curation service according to an exemplary embodiment of the present invention.

Referring to FIG. 2, a first electronic device 100 can select contents to be scrapped in step 200, and can scrap the contents by using a user gesture (e.g., an operation of dragging an object designated as a block as shown in FIG. 1A) or a contents menu in step 204. For example, after loading a webpage, the first electronic device 100 can detect that a part of a webpage content is designated as a block and that the object designated as the block is dragged to the basket area 102. Alternatively, after opening a specific folder, it can detect that a corresponding file in the specific folder is selected and is dragged to the basket area 102.

In step 206, the first electronic device 100 determines whether the curation folder exists on a home screen or a wallpaper. If the curation folder exists, the procedure proceeds to step 208. Otherwise, if the curation folder does not exist, proceeding to step 210, the first electronic device 100 generates the curation folder in the home screen or the wallpaper.

In step 208, the first electronic device 100 can perform a file copy or link generation operation on scrapped contents in the curation folder. That is, the scrapped contents can be stored in a corresponding file format (e.g., a text or an image) or can be stored in a file including a link connected to the scrapped contents. The file including the link implies a Uniform Resource Locator (URL) including the scrapped contents.

In step 212, the first electronic device 100 performs a contents preview operation when the curation folder is open. For example, scrapped contents files in the curation folder can be previewed in a thumbnail form (e.g., FIG. 1B) or a tile form (e.g., FIG. 1C). Herein, the scrapped contents files in the curation folder can be deleted or can be moved to another folder.

In step 214, when a specific scrapped contents file in the curation folder is selected by a user, the first electronic device 100 can display the content of the scrapped specific contents file by connecting to a corresponding viewer.

In this case, the specific scrapped contents file in the curation folder can be displayed by downloading it from a cloud server, or can be displayed by loading the scrapped specific contents file in its folder.

Figure 3:
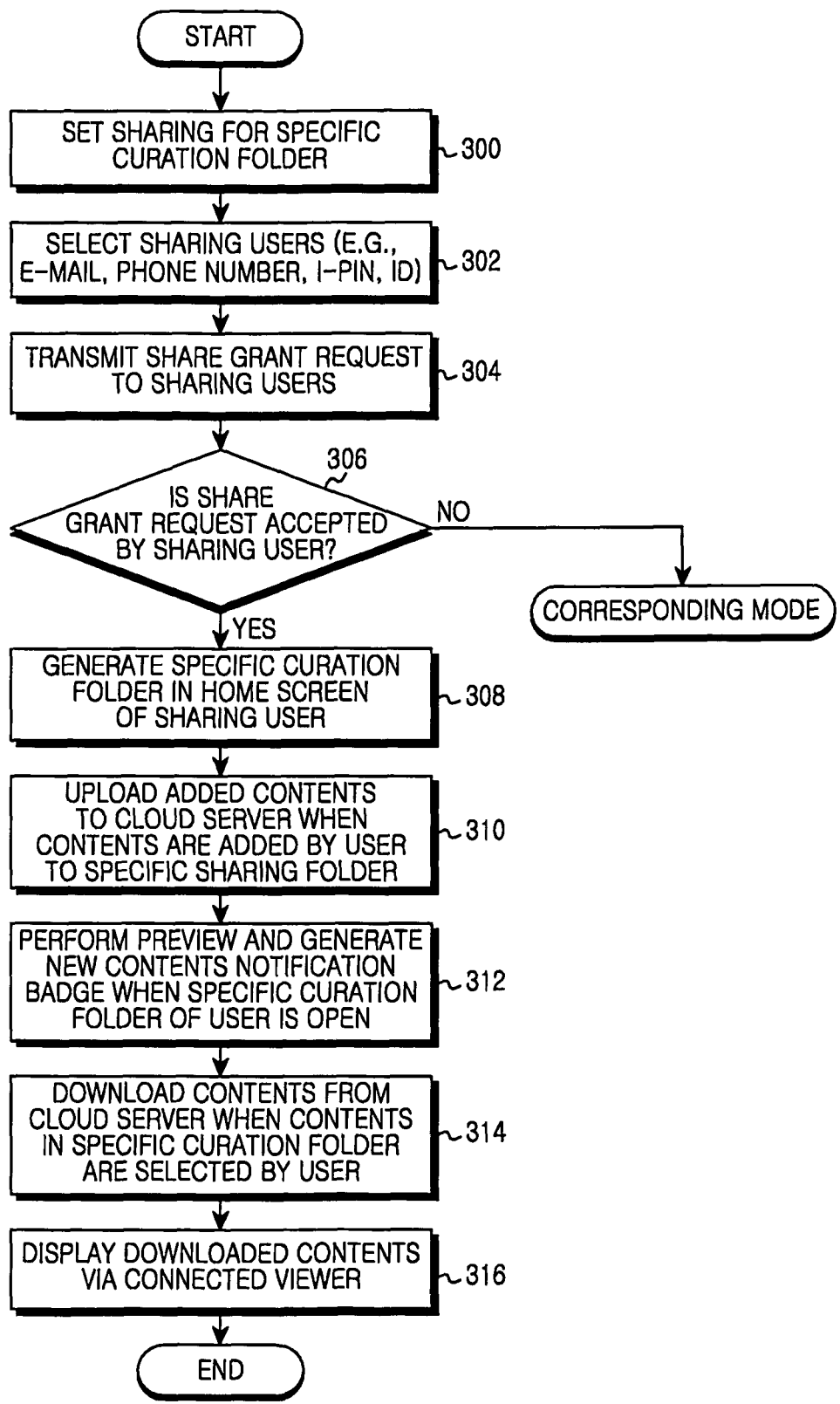
FIG. 3 is a flowchart illustrating an operation of a first electronic device which initiates a contents curation service according to an embodiment of the present invention.

FIG. 3 is a flowchart illustrating an operation of a first electronic device which initiates a contents curation service according to an embodiment of the present invention.

Referring to FIG. 3, in step 300, the first electronic device 100 sets a sharing for a specific curation folder in a wallpaper or a home screen according to a pre-defined procedure.

In step 302, the first electronic device 100 can select a user (hereinafter, called a "sharing user") for sharing its specific curation folder when the setting of the sharing is performed on the specific curation folder. For example, the sharing user can be selected from an address book. That is, the sharing user can be selected when selecting one of an e-mail, phone number, i-pin, or IDentifer (ID) of the sharing user.

In step 304, the first electronic device 100 can multicast a share request message for its specific curation folder to the selected sharing users.

In step 306, if the first electronic device 100 receives an accept message from the selected sharing users in response to the share grant message, the procedure proceeds step 308. Otherwise, upon receiving a reject message from the selected sharing users, a corresponding mode can be performed. For example, a message window can be provided to report that a corresponding sharing user rejects the share request with respect to its specific curation folder in the corresponding mode.

In step 308, the first electronic device 100 can be synchronized with the selected sharing users, and thus the specific curation folder of the first electronic device 100 can be generated and displayed on the screens of the selected sharing users (e.g., the second and third electronic devices 130 and 140 of FIG. 1 and FIG. 2). Herein, the curation folder itself can be shared to the sharing users designated by a user, or can be shared to the sharing users for each of scrapped contents in the curation folder.

In step 310, the first electronic device 100 can upload files of the scrapped contents in its specific curation folder to a cloud server.

Step 308 and step 310 are performed independently. Step 308 can be performed after step 310.

In step 312, when the specific curation folder is open, the first electronic device 100 can perform a contents preview, and also can generate a new contents notification arrangement if necessary. A badge can be displayed in a file of newly added scrap contents so that it can be known that the corresponding content thereof is shared. In step 314, when the specific scrapped contents file in the specific curation folder is selected by the user, the first electronic device 100 can download the specific scrapped contents file in the curation folder from the cloud server. In another exemplary embodiment, the first electronic device 100 can load the scrapped specific contents file in its folder.

In step 316, the first electronic device 100 can access to a corresponding viewer to display the content of the scrapped specific contents file.

In addition, in another exemplary embodiment, if a file size is great or if a storage capacity is insufficient in a folder of a sharing user, instead of synchronizing an actual file, only a link of the file can be synchronized to the cloud server, and if necessary, the file can be downloaded temporarily.

Figure 4:
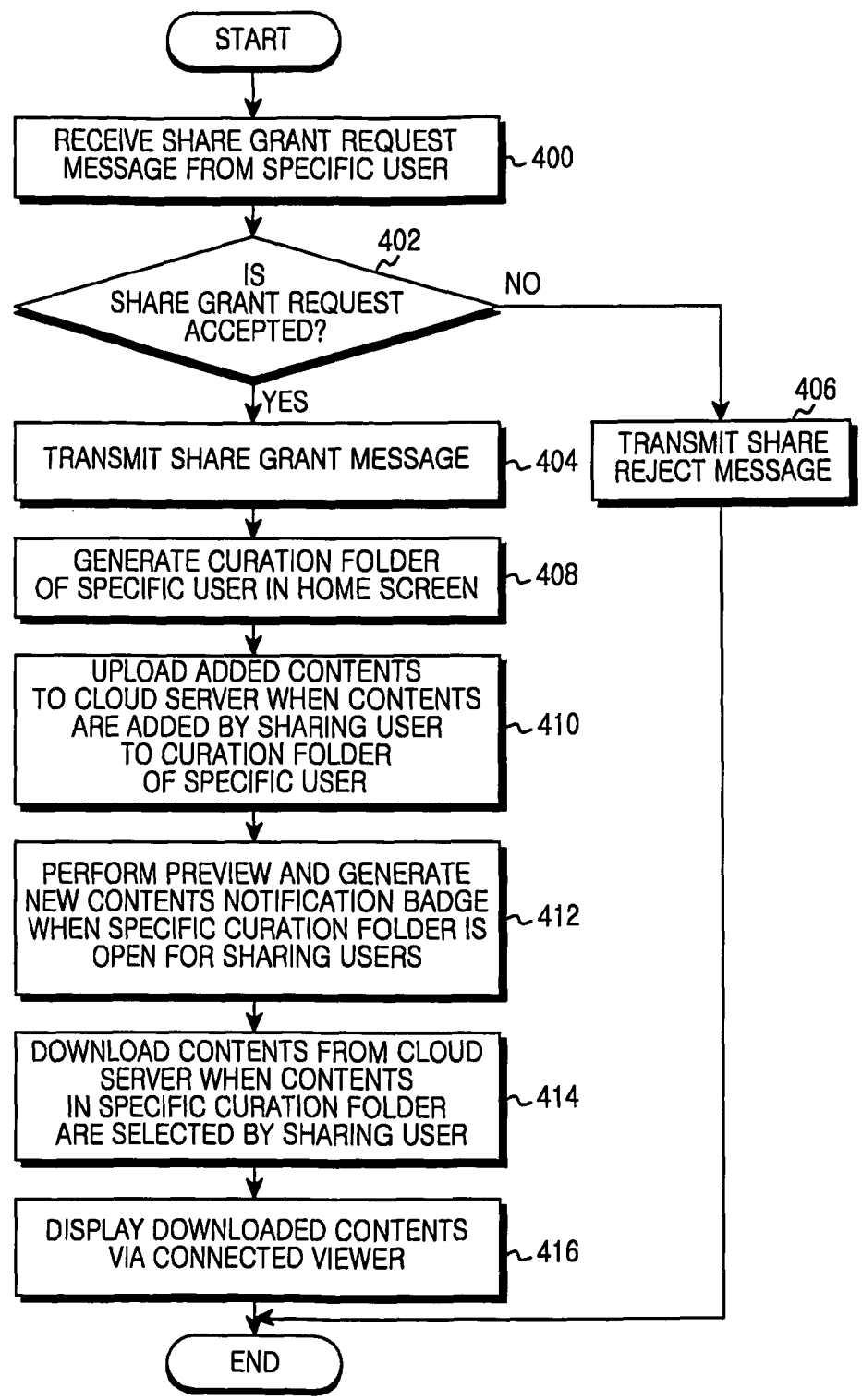
FIG. 4 is a flowchart illustrating an operation of a second or third electronic device for a contents curation service of a sharing user according to an embodiment of the present invention.

FIG. 4 is a flowchart illustrating an operation of a second or third electronic device for a contents curation service of a sharing user according to an exemplary embodiment of the present invention.

Referring to FIG. 4, in step 400, the second electronic device 130 or the third electronic device 140 can receive from the first electronic device 100 a message for a share grant message for a specific curation folder of the first electronic device 100.

In step 402, the second device 130 or the third electronic device 140 determines whether to accept or reject the share grant message.

If the share grant request of the first electronic device 100 is accepted, proceeding to step 404, the second electronic device 130 or the third electronic device 140 transmits a share grant message. Otherwise, if the share grant request is rejected, proceeding to step 406, the second electronic device 140 or the third electronic device 140 can transmit a share reject message.

In step 408, if the share grant request of the first electronic device 100 is accepted, the second electronic device 130 and the third electronic device 140 is synchronized to a specific curation folder of the first electronic device 100, and thus can generate the specific curation folder of the first electronic device 100 in its home screen or wallpaper.

In step 410, when its scrapped contents are added to the specific curation folder of the first electronic device 100, the second electronic device 130 or the third electronic device 140 can upload the contents to the cloud server. For example, the second electronic device 130 can add its scrapped contents 108 to the curation folder 104 of the first electronic device 100 or can add its scrapped contents 107 to the curation folder 104 of the first electronic device 100. The scrapped contents 107 and 108 are uploaded to the cloud server.

In step 412, when the specific curation folder is open, the second electronic device 130 or the third electronic device 140 can perform a contents preview, and also can generate a new contents notification arrangement if necessary. A badge can be displayed in a file of newly added scrap contents so that it can be known that the corresponding content thereof is shared.

In step 414, when the specific scrapped contents file in the specific curation folder of the first electronic device 100 is selected by the user, the second electronic device 130 or the third electronic device 140 can download the specific scrapped contents file in the curation folder of the first electronic device 100 from the cloud server.

In step 416, the second electronic device 130 or the third electronic device 140 can access to a corresponding viewer to display the content of the scrapped specific contents file in the specific curation folder.

Figure 5:
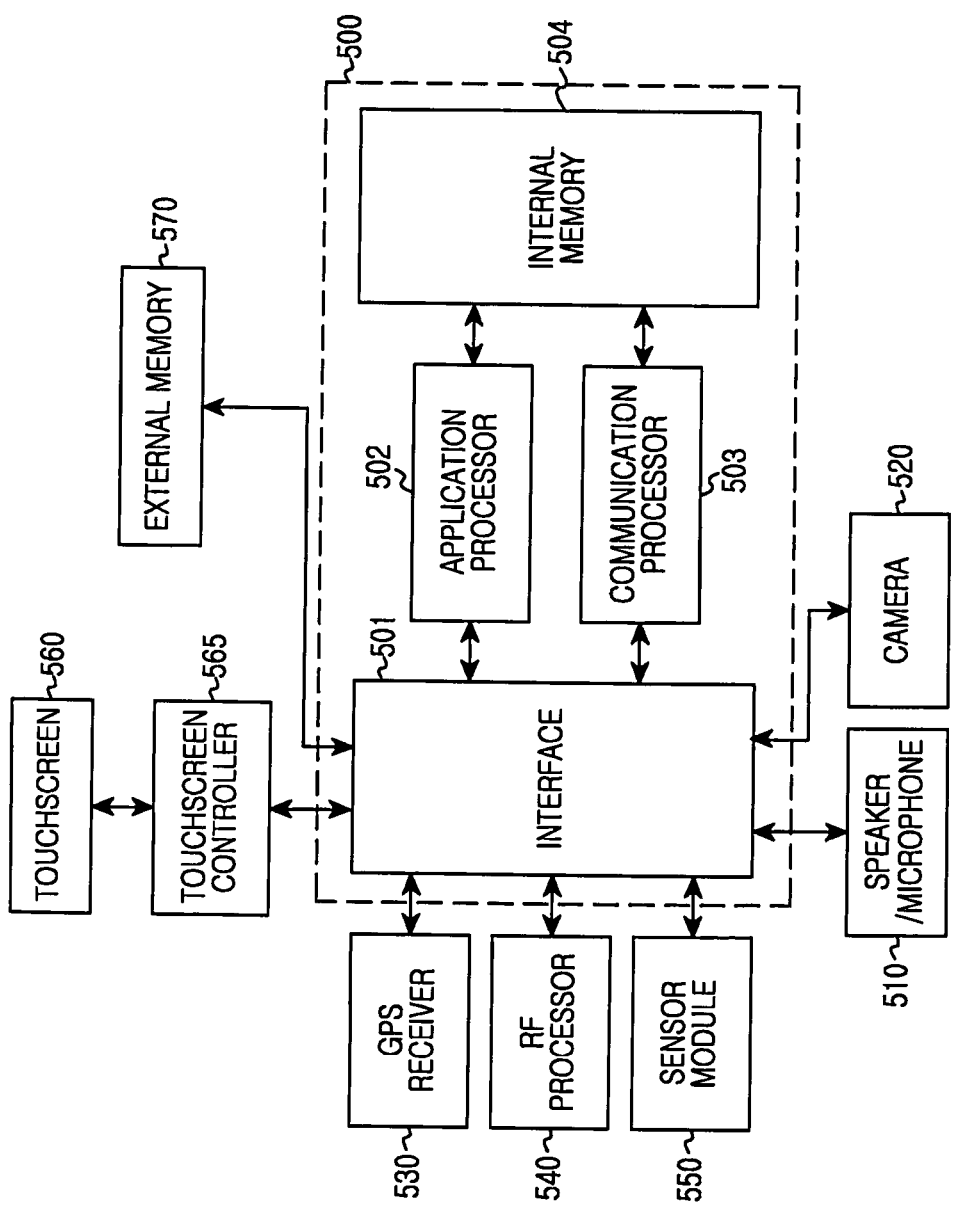
FIG. 5 is a block diagram of an electronic device according to an embodiment of the present invention.

FIG. 5 is a block diagram of an electronic device according to an exemplary embodiment of the present invention.

Herein, the electronic device can be a device such as a portable terminal, a mobile phone, a mobile pad, a media player, a tablet computer, a hand-held computer, or a Personal Digital Assistance (PDA). The electronic device can be any electronic device including a device which combines two or more functions of the aforementioned devices.

Referring to FIG. 5, the electronic device includes a controller 500, a speaker/microphone 510, a camera 520, a Global Positioning System (GPS) receiver 530, a Radio Frequency (RF) processor 540, a sensor module 550, a touch screen 560, a touch screen controller 565, and an external memory 570.

The controller 500 can include an interface 501, one or more processors 502 and 503, and an internal memory 504. Optionally, the entire part of the controller 500 can be referred to as a processor. The interface 501, the application processor 502, the communication processor 503, and the internal memory 504 can be separate components or can be integrated in one or more integrated circuits.

The application processor 502 performs various functions for the electronic device by executing a variety of software programs. The communication processor 503 processes and controls voice communication and data communication. In addition to such a typical function, the processors 502 and 503 also execute a specific software module (i.e., an instruction set) stored in the external memory 570 or the internal memory 504 and thus performing various specific functions corresponding to the module. That is, the processors 502 and 503 perform the method of the embodiment of the present invention by interworking with software modules stored in the external memory 570 or the internal memory 504. In the exemplary embodiment of the present invention, the application processor 502 can perform the aforementioned method for the contents curation service described in FIG. 2 to FIG. 4.

For example, the application processor 502 can be configured to select contents to be scrapped and scrapping the contents by using a user gesture (e.g., an operation of dragging an object designated as a block as shown in FIG. 1A) or a contents menu, determining whether the curation folder exists in a home screen or a wallpaper, and if the curation folder does not exist, generating the curation folder in the home screen or the wallpaper, perform a file copy or link generation operation on contents scrapped to the curation folder, if the curation folder is open, performing a contents preview operation, and if a specific scrapped contents file in the curation folder is selected by a user, displaying the content of the scrapped specific contents file by connecting to a corresponding viewer, wherein the specific scrapped contents file in the curation folder can be displayed by downloading it from a cloud server, or can be displayed by loading the scrapped specific contents file in its folder.

According to another exemplary embodiment, the application processor 502 can be configured to perform a share setting on a specific curation folder in a wallpaper or a home screen according to a pre-defined procedure, select a target (hereinafter, called a "sharing user") for sharing its specific curation folder when the share setting is performed on the specific curation folder (for example, the sharing user can be selected by selecting one of an e-mail, phone number, i-pin, or ID of the sharing user). The processor is configured to multicast to the selected sharing users a message for requesting a grant on the sharing for its specific curation folder, if a grant message is received from the selected sharing users with respect to the share request message, generate and display the specific curation folder of the first electronic device 100 in a screen of the selected sharing users (e.g., the second and third electronic devices 130 and 140 of FIG. 1 and FIG. 2) in synchronization with the selected sharing users, wherein the curation folder itself can be shared to the sharing users designated by a user, or can be shared with the sharing users for each of scrapped contents in the curation folder, upload files of the scrapped contents in its specific curation folder to a cloud server if the specific curation folder is open, perform a contents preview, or if necessary, generate a new contents notification arrangement, and when the specific scrapped contents file in the specific curation folder is selected by the user, download the specific scrapped contents file in the curation folder from the cloud server and access to a corresponding viewer to display the content of the scrapped specific contents file.

In addition, the application processor 502 can display a message to report that a corresponding sharing user rejects the share grant request with respect to its specific curation folder in the corresponding mode, upon receiving a reject message from the selected sharing users.

In another embodiment, the application processor 502 can be configured to receive a message for requesting to a grant for sharing a specific curation folder of a different electronic device, determine whether to accept or reject the share request message; if the share grant of the different electronic device is accepted, transmitting a share grant message, and otherwise, if the share request is rejected, transmitting a share reject message, if the share grant request of the different electronic device is accepted, generating the specific curation folder of the different electronic device in its home screen or wallpaper in synchronization with a specific curation folder of the different electronic device, when its scrapped contents are added to the specific curation folder of the different electronic device, uploading the contents to the cloud server, when the specific curation folder of the different electronic device is open, performing a contents preview, and also generating a new contents notification arrangement if necessary, when the scrapped specific contents file in the specific curation folder of the different electronic device is selected by the user, downloading the scrapped specific contents file in the curation folder of the different electronic device; and accessing to a corresponding viewer to display the content of the scrapped specific contents file in the specific curation folder.

The interface 501 connects the touch screen controller 565 of the electronic device and the external memory 507.

The sensor module 550 coupled to the interface 501 can enable various functions. For example, a motion sensor and an optical sensor can be coupled to the interface 501 to respectively enable motion sensing and external light-beam sensing. In addition thereto, other sensors such as a location measurement system, a temperature sensor, a biometric sensor, or the like can be coupled to the interface 501 to perform related functions.

The camera 520 can perform a camera function such as photographing, video clip recording, etc., by interworking with the sensor module 550 via the interface 501.

The RF processor 540 performs a communication function. For example, an RF signal is converted to a baseband signal under the control of the communication processor 503, and is then provided to the communication processor 503, or a baseband signal from the communication processor 503 is transmitted by being converted into an RF signal. Herein, the communication processor 503 processes the baseband signal by using various communication schemes. For example, although not limited thereto, the communication scheme can include a Global System for Mobile Communication (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTD) communication scheme, an Orthogonal Frequency Division Multiple Access (OFDMA) communication scheme, a Wireless Fidelity (Wi-Fi) communication scheme, a WiMax communication scheme, and/or a Bluetooth communication scheme.

The speaker/microphone 510 can input and output an audio stream such as voice recognition, voice reproduction, digital recording, and telephony functions. That is, the speaker/microphone 510 converts an audio signal into an electronic signal or converts the electronic signal into the audio signal. Although not shown, an attachable and detachable ear phone, headphone, or headset can be connected to the electronic device via an external port.

The touch screen controller 565 can be coupled to the touch screen 560. Although not limited thereto, the touch screen 560 and the touch screen controller 565 can use not only capacitance, resistance, infrared and surface sound wave techniques for determining one or more contact points but also any multi-touch sense technique including other proximity sensor arrays or other elements to detect a contact, a movement, or stopping thereof.

The touch screen 560 provides an input/output interface between the electronic device and the user. That is, the touch screen 560 delivers a touch input of the user to the electronic device. In addition, the touch screen 560 is a medium which shows an output from the electronic device to the user. That is, the touch screen shows a visual output to the user. Such a visual output is represented in the form of a text, a graphic, a video, and a combination thereof.

A variety of displays can be used as the touch screen 560. For example, although not limited thereto, the touch screen 560 can include a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED).

The GPS receiver 530 converts a signal received from a satellite into information of a location, a speed, a time, tec. For example, a distance between the satellite and the GPS receiver is calculated by multiplying a speed of light by a signal arrival time, and a location of the electronic device is measured according to a principle of a well-known triangulation by obtaining a distance and a correct location of three satellites.

The external memory 570 or the internal memory 504 can include a fast random access memory and/or a non-volatile memory, one or more magnetic disc storage devices and/or a flash memory (e.g., NAND, NOR).

The external memory 570 or the internal memory 504 stores a software component. The software component includes an operating system software module, a communication software module, a graphic software module, a user interface software module, a Moving Picture Experts Group (MPEG) module, a camera software module, one or more application software modules, etc. In addition, since a module, i.e., a software component, can be expressed as a group of instructions, the module can also be expressed as an instruction set. The module is also expressed as a program.

The operating system software includes various software components for controlling a general system operation. The control of the general system operation includes memory management and control, storage hardware (device) control and management, power control and management, etc. In addition, the operating system software performs a function for facilitating communication between various hardware elements (devices) and software elements (modules).

The communication software module can enable communication with other electronic devices such as a computer, a server, and/or a portable terminal via the RF processor 540. Further, the communication software module consists of a protocol structure conforming to a corresponding communication scheme.

The graphic software module includes various software components for providing and displaying graphics on the touch screen unit 560. The terminology of "graphics" indicates a text, a web page, an icon, a digital image, a video, an animation, etc.

The user interface software module includes various software components related to a user interface. The user interface software module includes the content related to how a state of the user interface changes and in which condition the state of the user interface changes.

The camera software module includes a camera-related software component which enables camera-related processes and functions. The application module includes a browser, an e-mail, an instant message, word processing, keyboard emulation, an address book, a touch list, a widget, a Digital Right Management (DRM), voice recognition, voice reproduction, a location determining function, a location-based service, etc. The memories 570 and 504 can further include additional modules (instructions) in addition to the aforementioned modules. Alternatively, optionally, some of the modules (instructions) may not be used.

Regarding an exemplary embodiment of the present invention, the application module includes an instruction for providing a contents curation service. The instruction according to the exemplary embodiment of the present invention can include an instruction for performing the procedures of FIG. 2 to FIG. 4.

For example, the application module can include an instruction for: selecting contents to be scrapped and scrapping the contents by using a user gesture (e.g., an operation of dragging an object designated as a block as shown in FIG. 1A) or a contents menu; determining whether the curation folder exists in a home screen or a wallpaper, and if the curation folder does not exist, generating the curation folder in the home screen or the wallpaper; performing a file copy or link generation operation on contents scrapped to the curation folder; if the curation folder is open, performing a contents preview operation; and if a specific scrapped contents file in the curation folder is selected by a user, displaying the content of the scrapped specific contents file by connecting to a corresponding viewer, wherein the specific scrapped contents file in the curation folder can be displayed by downloading it from a cloud server, or can be displayed by loading the scrapped specific contents file in its folder.

According to another exemplary embodiment, the application module can include an instruction for: performing a share setting on a specific curation folder in a wallpaper or a home screen according to a pre-defined procedure; selecting a target (hereinafter, called a "sharing user") for sharing its specific curation folder when the share setting is performed on the specific curation folder (for example, the sharing user can be selected by selecting one of an e-mail, phone number, i-pin, or ID of the sharing user); multicasting to the selected sharing users a message for requesting a grant on the sharing for its specific curation folder; if a grant message is received from the selected sharing users with respect to the share request message, generating and displaying the specific curation folder of the first electronic device 100 in a screen of the selected sharing users (e.g., the second and third electronic devices 130 and 140 of FIG. 1 and FIG. 2) in synchronization with the selected sharing users, wherein the curation folder itself can be shared to the sharing users designated by a user, or can be shared to the sharing users for each of scrapped contents in the curation folder; uploading files of the scrapped contents in its specific curation folder to a cloud server; if the specific curation folder is open, performing a contents preview, or if necessary, generating a new contents notification arrangement; and when the specific scrapped contents file in the specific curation folder is selected by the user, downloading the specific scrapped contents file in the curation folder from the cloud server and accessing to a corresponding viewer to display the content of the scrapped specific contents file.

In addition, the application module can further include an instruction for displaying a message window to report that a corresponding sharing user rejects the share grant request with respect to its specific curation folder, upon receiving a rejection message from the selected sharing users.

In another exemplary embodiment, the application modules can include an instruction for receiving a message for requesting to a grant for sharing a specific curation folder of a different electronic device; determining whether to accept or reject the share grant message, if the share grant request of the different electronic device is accepted, transmitting a share grant message, and otherwise, if the share grant request is rejected, transmitting a share reject message, if the share grant request of the different electronic device is accepted, generating the specific curation folder of the different electronic device in its home screen or wallpaper in synchronization with a specific curation folder of the different electronic device; when its scrapped contents are added to the specific curation folder of the different electronic device, uploading the contents to the cloud server, when the specific curation folder of the different electronic device is open, performing a contents preview, and also generating a new contents notification arrangement if necessary; when the scrapped specific contents file in the specific curation folder of the different electronic device is selected by the user, downloading the scrapped specific contents file in the curation folder of the different electronic device; and accessing to a corresponding viewer to display the content of the scrapped specific contents file in the specific curation folder.

Methods based on the embodiments disclosed in the claims and/or specification of the present invention can be implemented in hardware, software, or a combination of both:

When implemented in software, computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access via an external port to the electronic device.

In addition, an additional storage device on a communication network may access to a portable electronic device.

As described above, since a user interface is provided to scrap a part or entirety of specific contents by considering a user convenience in an electronic device, a file or tile corresponding to scrapped contents of a curation folder can be rapidly selected and open without having to open the file after executing a specific application.

In addition, a curation folder including contents scrapped by a specific user can be used conveniently by sharing the convents with a plurality of sharing users.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of providing a content curation service in an electronic device, the method comprising:
displaying content on a screen of the electronic device
selecting a part of the content based on a first input;
in response to selecting the part of the content, displaying a region for generating a file associated with the part of the content on a part of the screen;
detecting a second input dragging the part of the content to the region;
in response to detecting the second input, identifying an attribute of the part of the content;
determining a file format corresponding to the attribute of the part of the content;
generating, based on the file format, the file associated with the part of the content in a specific folder;
setting a shareability of the specific folder by designating at least one external electronic device;

transmitting a share request message for the specific folder to the at least one external electronic device;
receiving an accept message for the share request message from the at least one external electronic device; and
synchronizing the specific folder of the electronic device with a specific folder of the at least one external electronic device.

2. The method of claim 1, further comprising displaying a preview of at least one file included in the specific folder in a thumbnail or tile form when the specific folder is open.

3. The method of claim 1, further comprising:
in response to detecting a third input for executing the file, loading the file from an internal auxiliary memory to a main memory.

4. The method of claim 1, further comprising uploading the file to a server.

5. The method of claim 4, wherein the displaying the part of the content comprises:
in response to detecting a third input for executing the file, receiving the file from the server; and
displaying the part of the content via the viewer.

6. The method of claim 1, wherein the at least one external electronic device is designated by one of an e-mail, phone number, i-pin, and identifier of the at least one external electronic device.

7. The method of claim 1, wherein the setting of the shareability of the specific folder comprises sharing all files included in the specific folder with the at least one external electronic device.

8. The method of claim 1, wherein the setting of the shareability of the specific folder comprises sharing each of the files included in the specific folder with some of the at least one external electronic device.

9. The method of claim 1, further comprising:
receiving, from an external electronic device, a share request message for a specific folder of the external electronic device;
transmitting, to the external electronic device, an accept message for the share request message; and
synchronizing the specific folder of the electronic device with the specific folder of the external electronic device.

10. An electronic device for providing a content curation service, the device comprising:
a memory;
a touch screen; and
a processor configured to:
control the touch screen to display content on a screen;
select a part of the content based on a first input;
in response to selecting the part of the content, control the touch screen to display a region for generating a file associated with part of the content on a part of the screen;
detect a second input dragging the part of the content to the region;
in response to detecting the second input, identify an attribute of the part of the content;
determine a file format corresponding to the attribute of the part of the content;
generate, based on the file format, the file associated with the part of the content in a specific folder;
set a shareability of the specific folder by designating at least one external electronic device;
transmit a share request message for the specific folder to the at least one external electronic device;
receive an accept message for the share request message from the at least one external electronic device; and
synchronize the specific folder of the electronic device with a specific folder of the at least one external electronic device.

11. The device of claim 10, wherein the processor is configured to control the touch screen to display a preview of at least one file included in the specific folder in a thumbnail or tile form when the specific folder is open.

12. The device of claim 10, wherein the processor is configured to: in response to detecting a third input for executing the file, load the file from an internal auxiliary memory to a main memory.

13. The device of claim 10, wherein the processor is configured to unload the file to a server.

14. The device of claim 13, wherein the processor is configured to:
in response to detecting a third input for executing the file, receive the file from the server; and
control the touch screen to display the part of the content via the viewer.

15. The device of claim 10, wherein the at least one external electronic device is designated by one of an e-mail, phone number, i-pin, and identifier of the at least one external electronic device.

16. The device of claim 10, wherein the processor is configured to, when the sharing of the specific folder is set, share all files included in the specific folder to the at least one external electronic device.

17. The device of claim 10, wherein the processor is configured to, when the sharing of the specific folder is set, share each of the contents in the specific folder to some of the at least one sharing user or to all sharing users.

18. The device of claim 10, wherein the processor is further configured to:
receive, from an external electronic device, a share grant request message for a specific folder of the external electronic device;
transmit, to the external electronic device, an accept message for the share grant message; and
synchronize the specific folder of the electronic device with the specific folder of the external electronic device.

* * * * *